United States Patent Office 3,325,535
Patented June 13, 1967

3,325,535
C-NORSTEROIDS
Kenneth G. Holden, Stratford, N.J., and James F. Kerwin, Broomall, Pa., assignors to Smith Kline & French Laboratories, Philadelphia, Pa., a corporation of Pennsylvania
No Drawing. Filed Mar. 19, 1965, Ser. No. 441,304
10 Claims. (Cl. 260—488)

This invention relates to steroid compounds. In particular, the invention relates to C-norandrostanes and androstenes having hormonal, central nervous system, and cholesterol-lowering activities, and to intermediates therefor.

The compounds of the present invention are characterized by a 5-membered C-ring, in contrast to the 6-membered C-ring possessed by conventional steroids. They are therefore designated as C-norandrostanes. They are further characterized by the presence of a 3-keto group, an optional 4–5 double bond, and a variety of substituents at the 17-positon.

The compounds are thus represented by the following structural formula:

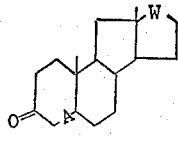

I wherein:

A is a single or a double bond;

W is $\overset{O}{\underset{\|}{C}}$ or $\overset{OR}{\underset{|}{C}}$—$R^1$

R is hydrogen, lower acyl or cyclopentenyl; and
$R^1$ is hydrogen, methyl, ethyl, or ethynyl.

Also considered part of the present invention are certain 3-keto-4-bromoandrostanes which are useful as intermediates for the preparation of the compounds of the invention.

For purposes of the present invention, it will be understood that the term "lower acyl" refers to those acyl groups having up to 5 carbon atoms therein, particularly acetyl, propionyl, and isobutyryl.

A preferred group of compounds is represented by the following structural formula:

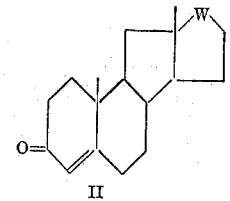

II where W is as described above.

Another preferred group of compounds is represented by the following structural formula:

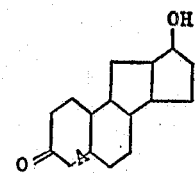

III

CHART I

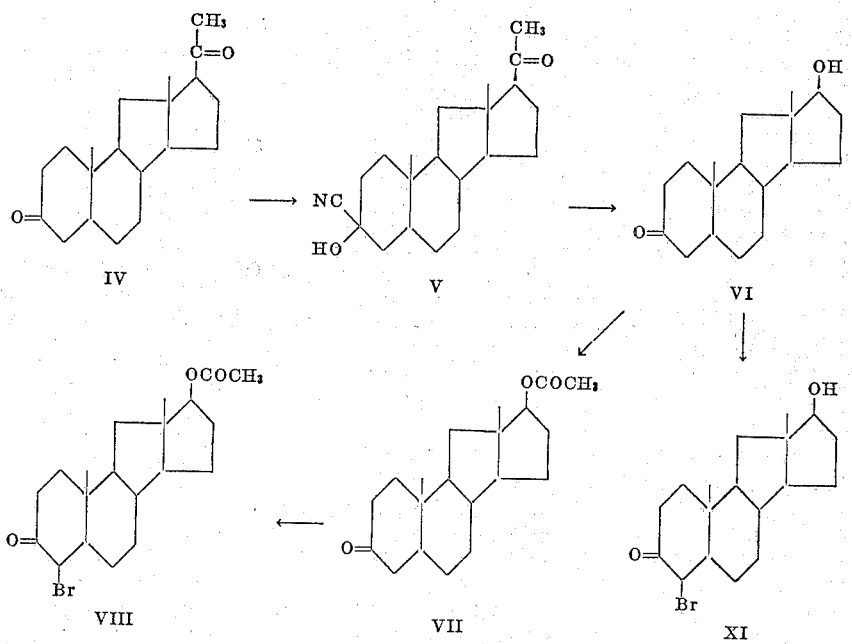

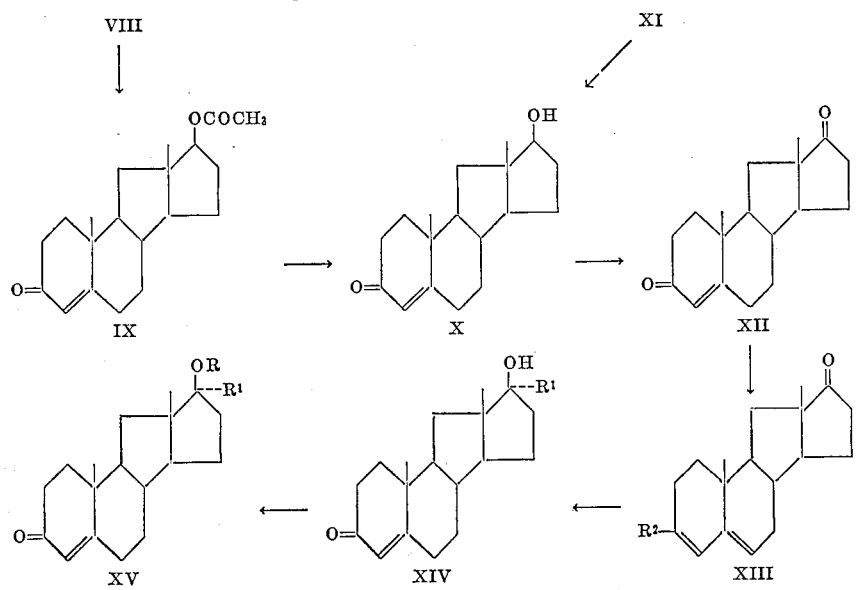

where A is as described above.

The compounds of the present invention are prepared in the following manner, reference being made to Chart I, below. 5β-C-norpregnane-3,20-dione (IV), prepared as described in our copending application Ser. No. 441,315, filed Mar. 19, 1965 is treated with a reagent capable of protecting the 3-ketone such as acetone cyanohydrin in order to form the cyanohydrin V. The cyanohydrin is then oxidized with a peracid such as m-chloroperbenzoic acid and then hydrolyzed with a strong base such as potassium hydroxide to yield 17β-hydroxy-5β-C-norandrostan-3-one (VI). This compound, in addition to its usefulness as an intermediate, also possesses central nervous system depressant activity. Compound VI is acylated at the 17-position, preferably with acetic anhydride in pyridine, and the 17-acetoxy compound VII brominated at the 4-position in the presence of an acid catalyst such as p-toluenesulfonic acid. The resultant intermediate, 17β-acetoxy-4-bromo-5β-C-norandrostan-3-one (VIII), is then dehydrobrominated by consecutive treatment with semicarbazide and pyruvic acid in acetic acid to obtain 17β-acetoxy-C-norandrost-4-en-3-one (IX.) Hydrolysis with a strong base such as aqueous methanolic sodium hydroxide gives the 17-alcohol X. This compound, 17β-hydroxy-C-norandrost-4-en-3-one (C-nortestosterone), is highly active as an androgenic and anabolic agent, and in addition possesses blood-cholesterol lowering activity.

Alternatively, this compound may be prepared by brominating compound VI directly, without protection of the 17-hydroxy group. Dehydrobromination of the resulting intermediate XI as described above results in the formation of the physiologically active C-nortestosterone (X). Failure to protect the 17-hydroxy group as in the latter sequence of reactions, however, results in the product X being obtained in the form of a mixture with the analogous 17-ketone, C-norandrost-4-ene-3,17-dione (XII). The compounds are separated by fractional crystallization. The dione XII is also prepared by oxidation of the 17-alcohol X with a reagent such as chromic acid.

Other C-norandrostane compounds of the invention having certain 17α-substituents are prepared in the following manner from the diketone XII. The 3-keto group is protected by either of two methods. An enamine compound (XIII, R²=pyrrolidino) is prepared by treating the 3-ketone with pyrrolidine in methanol. Alternatively, an enol ether (XIII, R²=methoxy) is prepared by treating the 3-ketone with trimethyl orthoformate containing p-toluenesulfonic acid. Either of these protected compounds XIII is then treated with a Grignard reagent or a metal alkyl compound and then hydrolyzed to give a compound of structure XIV. Grignard reagents such as methyl magnesium bromide and ethyl magnesium bromide and metal alkyl compounds such as methyl lithium and lithium or potassium acetylide may be used. The products (XIV) have a methyl, ethyl, or ethynyl group at the 17α-position. The 17β-hydroxy group may be esterified with a reagent such as acetic anhydride, propionic anhydride, or isobutyric anhydride to give a compound of structure XV, in which R is lower acyl and R¹ is methyl, ethyl, or ethynyl, or when R¹ is hydrogen, etherified with standard reagents including a ketal of cyclopentanone or cyclohexanone to give the corresponding cyclopentenyl or cyclohexenyl ether.

It will be apparent to one skilled in the art of organic chemistry that the starting material for the preparation of the inventive compounds may possess further substituents and/or double bonds which do not hinder the conduct of the reactions described herein. Alternatively, such groups may be introduced at an appropriate stage in the synthetic route by reactions known to the art. Exemplary of such groups are methyl, hydroxy, acyloxy, halo, amino, or a double bond. The 19-methyl group may also be eliminated. Also, such 17-esters as the cyclopentylpropionate, phenylpropionate, and benzoate as are well known to the art may be used instead of the lower acyl esters, and esters such as the tetrahydropyranyl ethers may be prepared. Insofar as these compounds or their preparation do not depart from the essential aspect of the present invention, i.e. the C-norandrostane system, they are thus considered equivalents of the compounds specifically described.

The C-norandrostanes of the present invention are administered to an appropriate subject in the form of tablets or capsules containing effective, but nontoxic amounts of steroid mixed with a conventional solid carrier. The carrier contains one or more standard ingredients such as starch, sugar, gums, etc. They are also administered in an oil solution such as sesame oil. They may further be administered in the form of suppositories, dissolved or suspended in a fatty or waxy vehicle which melts approximately at body temperature, or topically in the form of an ointment or cream in which they are dissolved or suspended in an appropriate base.

The following examples are to be considered illustrative of the compounds of the invention but are not to be considered as limiting the scope thereof.

Example 1.—3-cyano-3-hydroxy-5β-C-norpregnan-20-one

To a solution of 0.34 g. of 5-β-C-norpregnane-3,20-dione in 20 ml. of absolute ethanol is added 0.15 ml. of acetone cyanohydrin and 2 drops of triethylamine. The solution remains at 25° for 18–20 hours and is diluted with 200 ml. of water. The precipitate is extracted into ethyl acetate which is thoroughly washed with water. The residue obtained by drying and evaporation of the ethyl acetate solution is crystallized from ether-hexane solution, M.P. 161–2°. Recrystallization from methylene chloride-hexane solution yields pure 3-cyano - 3 - hydroxy-5β-C-norpregnan-20-one (V), M.P. 171–3°.

Example 2.—17β-hydroxy-5β-C-norandrostan-3-one

A solution of 4.8 g. of 3-cyano-3-hydroxy-5β-C-norpregnan-20-one (V) in 100 ml. of methylene chloride is treated with 5.0 g. of m-chloroperbenzoic acid and the reaction mixture is stored at 25° for 6 days. The solution is diluted with 100 ml. of methylene chloride, washed with dilute solution of sodium sulfite and sodium bicarbonate, dried and then concentrated to a viscous oil. The oil is dissolved in 80 ml. of methyl alcohol; 20 ml. of water containing 5 g. of potassium hydroxide is added, and the solution is heated at reflux temperature for 2 hours. The hydrolysate is concentrated in vacuo to crystallization and diluted to 500 ml. with cold water. The precipitate is filtered and recrystallized from methanol-water solution to give 17β-hydroxy-5β-C-norandrostan-3-one (VI), M.P. 173–5°.

Example 3.—17β-acetoxy-5β-C-norandrostan-3-one

A solution of 11.0 g. of 17β-hydroxy-5β-C-norandrostan-3-one (VI) in 250 ml. of pyridine is treated with 30 ml. of acetic anhydride. The reaction is permitted to proceed at 25° C. for 20 hours and is then concentrated in vacuo to 80 ml. The concentrate is diluted with water and the precipitate is extracted into benzene. The benzene layer is cycled through dilute sodium bicarbonate and phosphoric acid washes before drying and concentration. The oily concentration is crystallized from n-hexane to yield, 17β-C-norandrostan-3-one (VII), M.P. 108–10°.

Example 4.—17β-hydroxy-C-norandrost-4-en-3-one

A solution of 9.0 g. of 17β-acetoxy-5β-C-norandrostan-3-one (VII) in dimethylformamide (35 ml.) is treated with 240 mg. of p-toluenesulfonic acid and a solution of 4.80 g. of bromine in 25 ml. of dimethylformamide is slowly added over a 3 hour period. The reaction mixture is diluted with water and the precipitate is filtered and washed with water. A methylene chloride solution of the precipitated 4-bromo derivative (VIII) is dried and concentrated to an oil. The oil is dissolved in 100 ml. of 1:1 (v./v.) methylene chloride:tertiarybutyl alcohol and is treated with 4.2 g. of semicarbazide. The mixture is agitated for 1.5 hours; a solution of 9.8 g. of pyruvic acid in 40 ml. of 80% acetic acid is added, and the mixture is maintained at 25° for 28 hours. The mixture is filtered and the filtrate is concentrated to an oil which is dissolved in methylene chloride and cycled through dilute sodium bicarbonate and phosphoric acid washes. Concentration of the dried methylene chloride extracts gives 17β-acetoxy-C-norandrost-4-en-3-one (IX), which is treated with 150 ml. of 20% aqeuous methanol containing 5% sodium hydroxide. The saponification is conducted at reflux temperature for 1.5 hours and is poured into cold water. The precipitate is extracted into methylene chloride and the solvent is removed from the dried extract to yield an oil. Crystallization of the oil from acetone-hexane gives 17β-hydroxy-C-norandrost-4-en-3-one (X), M.P. 202–204°, $[\alpha]_D^{25} = +151.0°$.

Example 5.—4-bromo-17β-hydroxy-5β-C-norandrostan-3-one

A stirred solution of 2.22 g. of 17β-hydroxy-5β-C-norandrostan-3-one (VI) in 60 ml. of dimethylformamide is treated with 60 mg. of p-toluenesulfonic acid, and 0.715 ml. of bromine in 60 ml. of dimethylformamide is added dropwise over a 4 hour period. Stirring is continued at 25° for 1 hour and the solution is diluted to 1.5 liters with water. The precipitate is collected by filtration, washed with water, dissolved in methylene chloride and dried. Concentration of the methylene solution gives a crystalline mass from which 4-bromo-17β-hydroxy-5β-C-norandrostan-3-one (XI), M.P. 154–6° dec. is obtained by recrystallization from acetone-hexane.

Example 6.—17β-hydroxy-C-norandrost-4-en-3-one

Crude 4-bromo-17β-hydroxy-5β - C-norandrostan-3-one (XI, 3.4 g.) is dissolved in 80 ml. of 1:1 (v./v.) methylene chloride-tertiarybutanol, and the solution is treated with 1.93 g. of semicarbazide. Reaction proceeds for 1 hour and the mixture is treated with a solution of 6.0 ml. of pyruvic acid in 7.0 ml. water and 30 ml. acetic acid. The reaction mixture is filtered after 18 hours at 25° and the precipitate is washed with ether. The combined filtrate and wash is concentrated, diluted with water and the precipitate is partitioned into methylene chloride. Concentration of the extract gives an oil which crystallizes on trituration with ether to give 17β-hydroxy-C-norandrost-4-en-3-one (X), M.P. 203°. The ether filtrate is evaporated to a viscous residue which is chromatographed on Woelm activity III alumina. The combined, concentrated benzene eluates give C-norandrost-4-ene-3,17-dione (XII) on crystallization from acetone-hexane solution, M.P. 183°. Continued elution of the column with benzene-methylene chloride solution gives 17β-hydroxy-C-norandrost-4-en-3-one (X).

Example 7.—C-norandrost-4-ene-3,17-dione

A stirred solution of 5 g. of 17β-hydroxy-C-norandrost-4-en-3-one (X) in 100 ml. of acetone is cooled to 0° C. and treated with an excess of chromic acid. After 3 minutes, the reaction mixture is poured into water and extracted with methylene chloride. Evaporation of the combined and dried methylene chloride extracts gives C-norandrost-4-ene-3,17-dione (XII) which, after recrystallization from acetone-hexane, melts at 183°.

Example 8.—3-methoxy-C-norandrosta-3,5-dien-17-one

A suspension of 2 g. of C-norandrost-4-ene-3,17-dione (XII) in 5 ml. of dioxane and 5 ml. of trimethyl orthoformate containing 0.02 g. of p-toluenesulfonic acid is stirred at room temperature for 3 hours. The reaction is quenched by adding 2 ml. of pyridine and is then poured into dilute sodium carbonate solution and extracted with methylene chloride. Evaporation of the dried methylene chloride extracts gives the crude product, 3-methoxy-C-norandrosta-3,5-dien-17-one which is purified by recrystallization from methanol containing a little pyridine.

Example 9.—3-pyrrolidino-C-norandrosta-3,5-dien-17-one

A solution of 2 g. of C-norandrost-4-ene-3,17-dione (XII) in 8 ml. of hot methanol is treated with 1 ml. of pyrolidine. After a few minutes the reaction mixture is cooled and filtered to give 3-pyrrolidino-C-norandrosta-3,5-dien-17-one.

Example 10.—17β-hydroxy-17α-methyl-C-norandrost-4-en-3-one

A solution of 1.3 g. of 3-methoxy-C-norandrosta-3,5-dien-17-one in 50 ml. of dry tetrahydrofuran is treated with 5 ml. of 3 M ethereal methyl magnesium bromide. The reaction mixture is slowly distilled under a nitrogen atmosphere until the reaction temperature reaches the boiling point of tetrahydrofuran. Heating is maintained for a total of 4 hours and the cooled reaction mixture is then treated with 20 ml. of water followed by 50 ml. of glacial acetic acid. The reaction mixture is heated on the steam bath for 30 minutes and is then diluted with water and extracted with methylene chloride, the methylene chloride extracts being washed in turn with diluted hydrochloric acid and sodium carbonate solution. Evaporation of the dried methylene chloride extracts gives a residue which is dissolved in 50% aqueous acetic acid and heated at 100° for 30 minutes. The reaction mixture is then evaporated at reduced pressure and distributed between methylene chloride and sodium carbonate solution. After drawing off the methylene chloride phase the aqueous phase is extracted with an additional portion of methylene chloride. Evaporation of the combined and dried methylene chloride extracts gives 17β-hydroxy-17α-methyl-C-norandrost-4-en-3-one which is purified by recrystallization from acetone-hexane.

*Example 11.—17α-ethyl-17β-hydroxy-C-norandrost-4-en-3-one*

By substituting ethyl magnesium bromide for methyl magnesium bromide and carrying out the procedure of Example 10, the title product is obtained.

*Example 12.—17α-ethynyl-17β-hydroxy-C-norandrost-4-en-3-one*

A mixture of 5 g. of potassium, 100 ml. of amyl alcohol, and 100 ml. of dry ether is cooled, and dry acetylene is flushed through the mixture for 2 hours. 3-methoxy-C-norandrostra-3,5-dien-17-one (5 g.) is added and the flushing continued for 4 hours. The ice bath is removed and acetylene addition is continued for 12 hours. The reaction mixture is shaken with 300 ml. of 10% aqueous ammonium chloride solution. The ether layer is separated and the aqueous layer is extracted with two fresh portions of ether. The combined ether layers are dried and evaporated to a residue which is dissolved in 100 ml. of 50% aqueous acetic acid. The reaction mixture is heated on the steam bath for 30 minutes, then diluted with water, and extracted with methylene chloride. The methylene chloride dried and evaporated to give the title product.

*Example 13.—17α-methyl-17β-propionyloxy-C-norandrost-4-en-3-one*

17β-hydroxy-17α-methyl-C-norandrost-4-en-3-one (1 g.) is dissolved in 20 ml. of propionic anhydride. The mixture is heated at 120° for 2 hours, poured into water, and the product extracted with ether. The ether extracts are washed with sodium carbonate solution and dried over anhydrous magnesium sulfate. Evaporation of the ether, followed by recrystallization, gives the title product.

Use of 17β-hydroxy-C-norandrost-4-en-3-one in the above reaction results in the formation of 17β-prionyloxy-C-norandrost-4-en-3-one.

*Example 14.—17β-(1-cyclopentenyloxy)-C-norandrost-4-en-3-one*

A mixture of 5 g. of 17β-hydroxy-C-norandrost-4-en-3-one and 10 ml. of cyclopentanone diethyl ketal is heated at 140–145° for 45 minutes. The temperature is then raised to 160–170° and volatile material allowed to distill slowly over a period of about 2 hours. Approximately 6 ml. of distillate is collected. The reaction mixture is cooled, diluted with aqueous methanol containing several drops of pyridine, and cooled further. The solid is collected and recrystallized to obtain the title product.

We claim:
1. A C-norsteroid of the structure

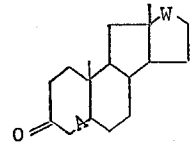

wherein:
A is selected from the group consisting of a single bond and a double bond;
W is selected from the group consisting of

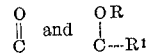

R is selected from the group consisting of hydrogen, 1-cyclopentenyl, lower alkanoyl of up to 5 carbon atoms, cyclopentylpropionyl, phenylpropionyl, and benzoyl; and
R¹ is selected from the group consisting of hydrogen, methyl, ethyl, and ethynyl.
2. 17β-hydroxy-C-norandrost-4-en-3-one.
3. 17β-acetoxy-C-norandrost-4-en-3-one.
4. C-norandrost-4-ene-3,17-dione.
5. 4-bromo-17β-hydroxy-5β-C-norandrostan-3-one.
6. 17β-acetoxy-4-bromo-5β-C-norandrostan-3-one.
7. 17β-acetoxy-5β-C-norandrostan-3-one.
8. 17β-hydroxy-5β-C-norandrostan-3-one.
9. 17β-(1-cyclopentenyloxy)-C-norandrost - 4 - en - 3-one.
10. 17β-hydroxy-17α-methyl-C-norandrost - 4 - en - 3-one.

References Cited

FOREIGN PATENTS 1,316,008  12/1962  France.

LORRAINE A. WEINBERGER, *Primary Examiner.*

V. GARNER, *Assistant Examiner.*